United States Patent [19]

Charbonnier

[11] Patent Number: 4,763,033
[45] Date of Patent: Aug. 9, 1988

[54] LOW POWER ELECTRIC SPEED REDUCER, PARTICULARLY FOR A HOME-TRAINER

[75] Inventor: Marc Charbonnier, Franconville, France

[73] Assignee: Labavia S.G.E., Montigny Le Bretonneux, France

[21] Appl. No.: 68,881

[22] Filed: Jul. 1, 1987

[30] Foreign Application Priority Data

Jul. 4, 1986 [FR] France ................................. 86 09776

[51] Int. Cl.$^4$ .............................................. H02K 49/04
[52] U.S. Cl. ..................................... 310/105; 188/267
[58] Field of Search ................... 188/155, 267; 310/40, 310/49 R, 93, 105, 178, 186, 77

[56] References Cited

U.S. PATENT DOCUMENTS 2,833,945  5/1958  Bessiere ................................. 310/93
4,324,992  4/1982  Paratte ................................ 310/49 R
4,491,755  1/1985  Bertrand ............................... 310/93

FOREIGN PATENT DOCUMENTS 1488733  6/1969  Fed. Rep. of Germany ...... 310/186

*Primary Examiner*—Patrick R. Salce
*Assistant Examiner*—D. L. Rebsch
*Attorney, Agent, or Firm*—Larson and Taylor

[57] ABSTRACT

An electric speed reducer of low power designed essentially for equipping home trainers comprises an armature rotor composed of two parallel discs of magnetic material fastened to the same shaft. The shaft is itself mounted on a suitable frame through bearings. The inductor stator is arranged so as to be mountable radially removably between the two discs, and comprises for this purpose a single pair of cores of cylindrical or prismatic material whose generators are parallel with the axis of the speed reducer, and of which only the first is surrounded by a coil of electric wire.

12 Claims, 2 Drawing Sheets

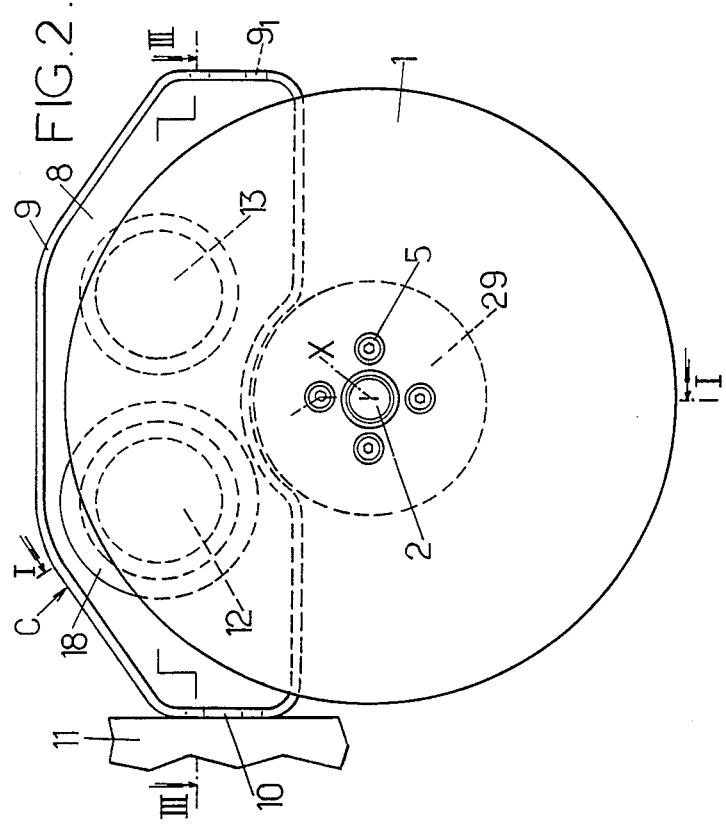
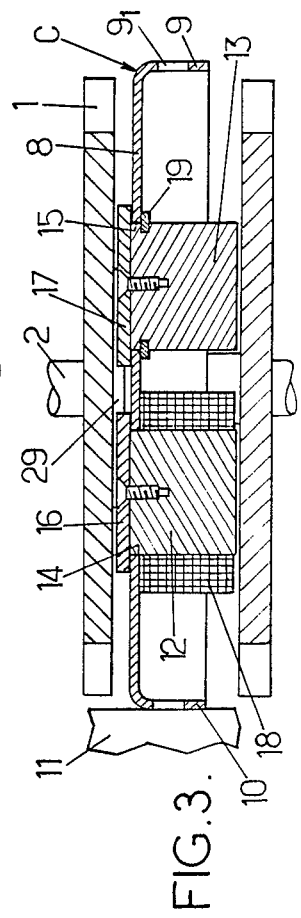
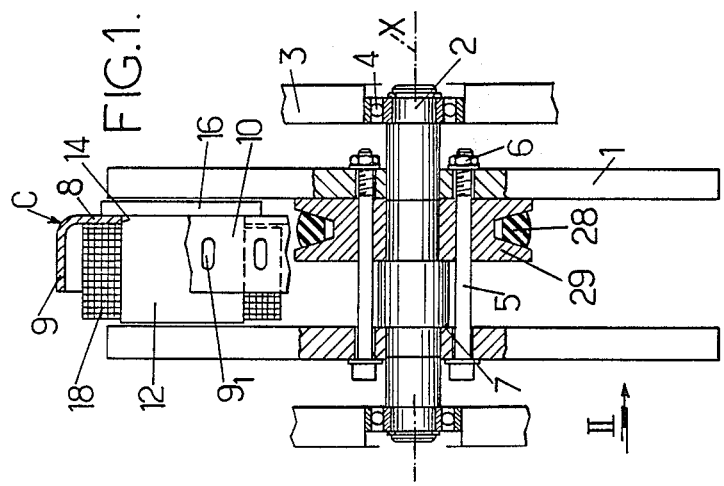

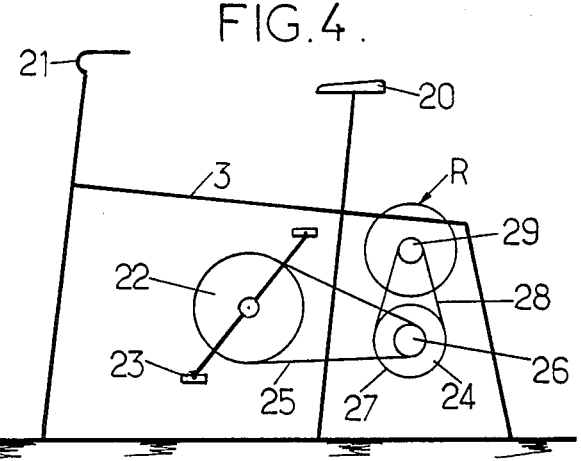
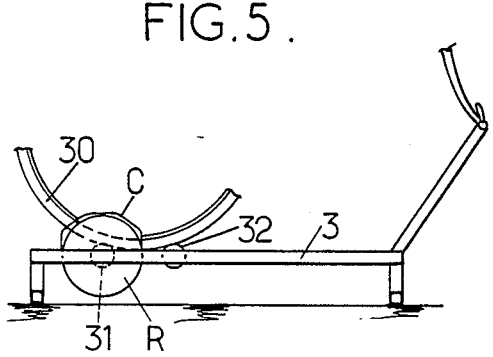
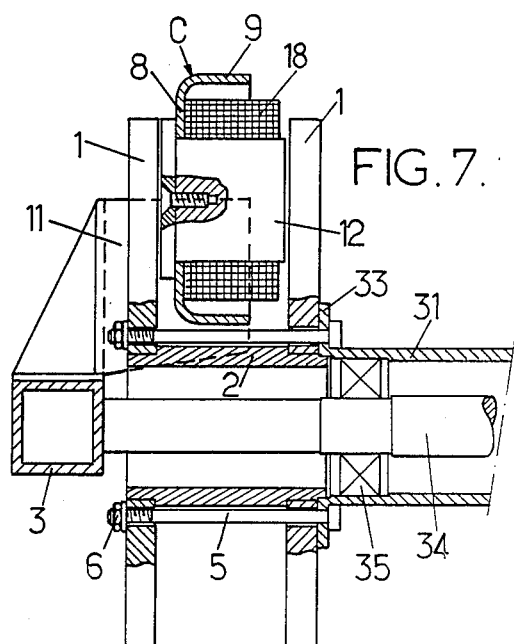
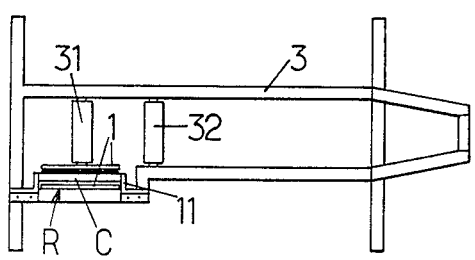

LOW POWER ELECTRIC SPEED REDUCER, PARTICULARLY FOR A HOME-TRAINER

BACKGROUND OF THE INVENTION

The invention relates to electric or "eddy current" speed reducers or retarders of low power, that is to say developing a moderate retarding torque.

It relates more particularly to home-exercisers, because it is in their case that its use seems to offer the most advantage, but not exclusively, in speed reducers, for home-trainers, and in particular fixed cycles designed for muscle development.

It is recalled that these cycles comprise a frame bearing a saddle, a crank-gear, a wheel driven by the rotation of this crank-gear generally through a chain cooperating with the chain wheel of the crank-gear and with a sprocket wheel angularly connected to the wheel, and braking means for this wheel.

These braking means work generally by friction and comprise a pad or roller applied with an adjustable force against a suitable portion of the wheel such as the rim or tire.

Such braking means have the drawback of a relatively rapid wear and difficult and unreliable adjustment.

To avoid these drawbacks, it has already been proposed to constitute braking means by a small eddy current brake.

GENERAL DESCRIPTION OF THE INVENTION

It is a particular object of the invention to provide such small speed reducers with a particularly robust and economic construction lending themselves to easy assembly and disassembly.

Accordingly, speed reducers of the type according to the invention comprise, in manner known in itself, an armature rotor composed of two parallel discs of magnetic material fastened to the same shaft. This shaft is mounted on a suitable frame through bearings.

An inductor stator comprising an even number of cylindrical or prismatic cores of magnetic material having longitudinal axes which are parallel to the axis of the speed reducer. These cores are adapted to form, when facing each of the two discs, a sequence of magnetic poles whose polarities are opposed closer and closer. The axes of the two cores of each pair of consecutive cores are comprised in two planes passing through the axis of the speed reducer and forming between one another an angle comprised between 45° and 90°, limits included. They are characterized in that the number of pairs of cores comprised by their inductor stator is equal to 1 and in that this stator is arranged so as to be removably radially mounted between the two rotor discs.

In advantageous embodiments, recourse is had, in addition, to one and/or others of the following features:

only one of the two cores of the single pair of cores is surrounded by a coil of electrical wire, each of the two cores passes through the flat bottom of a rigid dish-shaped member of amagnetic material and comprises, built onto one of its ends, an overlapping plate or shoe applied against the outer surface of said bottom, in a speed reducer according to the preceding paragraph, the mounting of each core surrounded by a coil on the bottom of the dish is completed by gluing of the coil of wire to the portion of this core within the dish, in a speed reducer according to at least the two last paragraphs but one, the mounting of each core not surrounded by a coil on the bottom of the dish is completed by the placing of a circlip or snap-ring in a groove of this core, the edge of the dish, flanged perpendicularly to its bottom, has two parallel sections sufficiently spaced from one another to permit the fixing of this dish on respectively two rigid elements forming part of the frame and framing the two discs with clearance, the fastening sections of the dish according to the preceding paragraph are recessed by oblong holes elongated parallel with the axis of the speed reducer and enabling the air gaps to be adjusted during the mounting of the dish on the frame, the dish has the general shape of a beard plate, the two discs are joined to one another by screwing nuts on threaded tie-rods which pass through them, which screwing applies each of these discs axially against a shoulder of the shaft or against a terminal section of a ring surrounding this shaft in adjacent relationship, the threaded tie-rods pass through a pulley coaxial with the two discs and adapted to receive a belt for the transmission of the retarding torque to another rotary member, itself joined angularly preferably to the crank-gear of a home-trainer, said pulley being preferably arranged axially between the two discs, the threaded tie-rods pass through a collar angularly fastened to a roll arranged to support the wheel of a home-trainer cycle.

The invention is also aimed at home trainers equipped with speed reducers of low power described above and especially arranged for this purpose.

It comprises, apart from the main features mentioned above, certain other features which are preferably used at the same time and which will be more explicitly discussed below.

In the following, some preferred embodiments of the invention will be described with reference to the accompanying drawings, given of course purely as non-limiting illustrations.

BRIEF DESCRIPTION OF THE DRAWINGS

FIGS. 1, 2 and 3 of the drawings, show resectively in axial section along the line I—I of FIG. 2, in end view along the arrow II of FIG. 1 and in section along III-—III of FIG. 2, an embodiment of an electric speed reducer constructed according to the invention.

FIG. 4 shows in diagrammatic perspective view a home trainer equipped with such a speed reducer.

FIGS. 5 and 6 show diagrammatically a part of another home trainer equipped with another speed reducer also constructed according to the invention, respectively in side elevation and in plan view.

FIG. 7 is an axial section of this latter embodiment of a speed reducer and of a portion of the apparatus equipped with the latter.

The speed reducers considered here are preferably designed for the equipment of home trainers, that is to say "fixed" cycles for exercising the muscles of their users.

DESCRIPTION OF PREFERRED EMBODIMENTS

In these apparatuses, a resistance adjustable at will is opposed to the pedaling force exerted by the users.

These resistances can be adjusted between a low value corresponding to the normal propelling of a bicycle unloaded over hard smooth and horizontal ground, and a high value corresponding to pushing the bicycle under difficult conditions such as, for example, the climbing of a steep slope, riding over sandy soil and/or the application of a heavy load.

The design of such a speed reducer is fundamentally different from that of speed reducers customarily used to brake heavy trucks.

For the latter, on the one hand, the mass to be rotated must be as light as possible. On the other hand, the retarding torque generated for a given weight must be as high as possible, the braking power being often greater than 100 kW.

In the present case, on the contrary, the weight of the rotary mass of the speed reducer can be relatively high and the maximum retarding torque must remain moderate. Thus the braking power varies, for example from 10 W to 1 kW.

The simultaneous observation of these two criteria permits:

on the one hand the use as an inductor rotor of the set of two relatively heavy parallel discs of magnetic material, and on the other hand the use of only a portion of the circumferential length of these two discs for the creation of eddy currents, said portion being, for example, comprised between a quarter and a half of said length.

The latter characteristic is quite unusual in the field concerned, since generally it is sought on the contrary to exploit for the creation of eddy currents the whole of the area of each disc.

It permits, in addition, the inductor state to be mounted radially removable between the two discs and the adoption for the whole of an extremely simple and rugged construction.

The two constituent parallel discs 1 of the inductor rotor, of axis X, can be seen in the drawings.

They are traversed through by a shaft 2 of axis X. Shaft 2 is mounted to rotate on the support frame 3 of the speed reducer through bearings 4, particularly of the axial thrust block type, permitting a good relative axial positioning.

The discs 1 are also traversed by threaded tie-rods 5 cooperating with nuts 6, so that the screwing of these nuts has the effect of applying the two discs axially against shoulders 7 of the shaft 2 or against the terminal sections of a spacer ring surrounding this shaft adjacently and fastened axially on the latter.

The inductor stator comprises a dish-shaped member C constituted by an amagnetic material such as stainless steel, said dish having a flat bottom 8 and rims 9 perpendicular to this bottom.

The bottom 8 is provided so as to cover an area of angular extent greater than 90° of the peripheral area of each disc. This area is bounded externally by the circular outer section of the disc 1 of diameter D, and internally by a circle of diameter D/2.

Beyond its portion covering the area thus-defined of each disc, the bottom 8 extends from side to side of this portion in the direction perpendicular to the axis of symmetry S of said area. Thus the rim 9 has two flat and parallel terminal sections 10 whose mean planes frame the two discs with clearance.

Through this fact, the dish C can be fixed to two rigid elements 11 of the frame 3. These elements 11 are straight and parallel and enclose the whole of the speed reducer without interfering with the rotation of the discs.

In the embodiment illustrated, the angular extent of the area covered is only a little greater than 90° and the bottom 8 is narrow and elongated.

In addition, the portion of said bottom 8 closest to the axis X of the rotor is here indented or cut out along a circular arc centered on this axis. This gives bottom 8 the general shape of an open and thick C, and to the dish, the general shape of a beard plate.

On the bottom 8 are mounted two cores 12 and 13 of magnetic material having the shape of a cylinder or prism whose longitudinal axes are parallel with the axis X.

Each of these two cores passes through an aperture 14, 15 cut out of the bottom 8.

An overlapping plate or shoe 16, 17 fastened to an axial end of each core, particularly by screwing, is applied adjacently against the outer surface of the edge of the corresponding aperture 14, 15.

The portion of the first core 12 within the dish is surrounded adjacently by a coil 18 of electric wire 18.

This coil 18 is glued to said core 12 immediately close to the bottom 8 of the dish, which renders the mounting of the core on the dish irreversible.

The mounting of the second core 13 on said dish is, for its part, rendered irreversible by the positioning of a circlips or snap-rings 19 (FIG. 3) in a groove cut out in the latter core in immediate proximity to the inner surface of the bottom of the dish.

The different cores 12 and 13, as well as the shoes 16 and 17, are dimensioned so as to define transverse flat areas arranged opposite the discs, at a short distance from these discs constituting an "air gap".

It is these flat areas which form the magnetic poles with alternate polarities of the stator when an electric current is sent into the coil 18. The magnetic flux generated by this current flows then successively, axially in the first core 12, circumferentially in one of the two discs 1, axially in reverse direction from the preceding one in the second core 13 and finally circumferentially in reverse direction from the preceding one in the second disc 1 to return then again to the first core 12. Eddy currents generating braking of the discs 1 are created by the variation of magnetic flux generated in these discs due to the fact of the simple rotation of each of these discs facing two fixed poles of opposite polarities.

Ports $9_1$ designed to receive bolt-nut fastening systems for the stator dish to the elements 11 are elongated parallel to the axis X to permit accurate adjustment of the air gaps during the screwing of said systems.

In the embodiments illustrated, the respective dimensions and positions of the two cores 12 and 13 between the discs 1 are those which would correspond to two of the six cores comprised in a conventional speed reducer with six poles distributed regularly around the axis X.

In other words, the axes of these two cores are respectively in two planes passing through the axis X and forming between them an angle of 60°.

The result thereof is that there is exploited here, for the creation of the eddy currents in the discs 1, only a third of the mass of each disc customarily exploited for this purpose.

It is to be noted in addition that only one of the two cores 12 and 13 is here surrounded by a coil 18, which further reduces the intensity of the eddy current generated by such an apparatus with respect to conventional comparable speed reducers.

As explained above, the relatively low value of the retarding torque which results from these arrangements does not constitute here a real drawback considering that it is not desired to generate a high braking torque.

The stator constituted by the dish and by the cores that it bears may be mounted removably between the two discs 1 in a radial direction with respect to the axis X, that is to say without any dismounting of these discs. This is quite unusual in the field of double disc electrical speed reducers, and notably simplifies repairs and maintenance.

As described above, a preferred use of the low-power speed reducers described above is the equipment of home trainers.

Two uses of this type are illustrated in FIGS. 4 to 7, where the speed reducer is symbolized by the reference R.

In the first application, shown diagrammatically in FIG. 4, the fixed frame 3 of the home trainer comprises a saddle 20, a handlebar 21, a crank-gear composed of a chain wheel 22 and two pedals 23, and a wheel 24. Wheel 24 is made angularly fast to the chain wheel 22 through a chain 25 cooperating on the one hand with the chain wheel 22 and on the other hand with a sprocket 26 angularly fast to the wheel 24.

This wheel 24 is bounded externally by a rim 27 having a groove in which is located a trapezoidal belt 28 cooperating with a small pulley 29 fast to the discs 1 of the speed reducer R.

As seen in FIGS. 1 to 3, this small pulley 29 is advantageously housed between the two discs 1. It is then advantageously traversed itself by the tie-rods 5.

Pulley 29 may be juxtaposed axially between one of the shoulders 7 of the shaft 2 and one of the two discs 1, as illustrated. However, it could also be arranged axially at half distance between the two discs 1, suitable spacing rings then being inserted axially between this pulley and each of these two discs.

As seen in FIG. 2, the cut-out provided in the stator dish on the side of the axle 2 is provided so as to enclose said pulley 29 with clearance.

In the second application forming the subject of FIGS. 5 to 7, the home trainer is essentially constituted by a partial bicycle whose rear wheel 30 rests on two horizontal rolls 31, 32 with parallel transverse axes.

The rotor (1, 2, 5, 6) of the speed reducer R is then angularly fast to one of these two rolls, in this case roll 31.

For this purpose, for example, tie-rods 5 above traverse not only the two discs 1, but also a collar 33 turned back radially from one axial end of the roll 31 concerned.

As seen in FIG. 7, the roll 31 concerned is mounted on an inner bar 34 fast to the frame 3 through rolls 35.

As a result of which, and whatever the embodiment adopted, there is finally provided a speed reducer of low power whose constitution, operation and advantages result sufficiently from the foregoing.

As is self-evident, and as emerges from the foregoing, the invention is in no way limited to those of its types of application and embodiments which have been more especially envisaged. It encompasses, on the contrary, all modifications, particularly where the two cores 12, 13 of magnetic material composing the inductor stator would be encircled by coils of electric wire.

I claim:

1. An electric speed reducer of low power comprising:

a frame having a shaft with an axis and bearing means for mounting said shaft to said frame;

an armature rotor including two parallel discs of magnetic material and a disc mounting means for fixedly mounting said discs to said shaft with a space between said discs;

an inductor stator including a single pair of cores, each said core having a longitudinal axis parallel to the axis of said shaft and being made of magnetic material whereby each said core has poles of opposite polarity; and a core mounting means for mounting said cores in the space between said discs so as to be radially removable and such that said cores are closely spaced to each said disc and are adjacent each other with adjacent poles of said cores having an opposite polarity, each axis of said cores forming a plane with the axis of said shaft such that an angle between the planes is between about 45° to 90°.

2. An electric speed reducer as claimed in claim 1 wherein said inductor stator includes a single coil of electric wire surrounding one of said cores.

3. An electric speed reducer as claimed in claim 1 wherein said core mounting means includes a rigid dish of a magnetic material, said dish including a flat bottom and a pair of apertures in said flat bottom through which respective ones of said cores extend; and wherein each said core includes an overlapping plate attached at each pole of two adjacent poles and in abutment with an outside surface of said flat bottom of said rigid dish.

4. An electric speed reducer as claimed in claim 3 wherein said inductor stator includes a single coil of electric wire surrounding one of said cores; and wherein said core mounting means includes a glue between said coil and an inside surface of said flat bottom of said dish.

5. An electric speed reducer as claimed in claim 2 wherein the other of said cores includes a circumferential groove therein adjacent an inside surface of said flat bottom of said dish; and wherein said core mounting means includes a snap-ring which is partially received in said groove of the other of said cores.

6. An electric speed reducer as claimed in claim 3 wherein said rigid dish includes a circumferential edge extending perpendicular to said bottom, said circumferential edge including two parallel fastening sections;

wherein said frame includes two rigid elements provided on opposite radial sides of said discs; and wherein said core mounting means mounts respective said fastening sections to respective said radial sides.

7. An electric speed reducer as claimed in claim 6 wherein said fastening sections include mounting apertures therein which are elongated in a direction parallel to the shaft axis.

8. An electric speed reducer as claimed in claim 3 wherein said dish is shaped similar to a beard plate.

9. An electric speed reducer as claimed in claim 1 wherein said disc mounting means includes threaded tie-rods passing through both said discs, associated screw nuts which are screwed onto respective said tie-rods to force said discs toward one another along the shaft axis, and a spacer means provided on said shaft between said discs for abutting said discs as said discs are moved toward one another to precisely space said discs.

10. An electric speed reducer as claimed in claim 9 wherein said spacer means includes a pulley mounted on said shaft between said discs and through which said tie-rods extend whereby a belt provided on said pulley transmits a driving force to said pulley which is braked by said pulley.

11. An electric speed reducer as claimed in claim 9 wherein said disc mounting means includes a collar supporting a wheel, which said collar is mounted on said bearing means, and apertures in said collar such that said tie-rods pass through said apertures in said collar.

12. A home trainer comprising:
a frame having a shaft with an axis and bearing means for mounting said shaft to said frame;
a wheel mounted to said shaft;
a driving means for driving said wheel in rotation by a user; and
an electric speed reducer of low power which brakes a driven rotation of said wheel, said speed reducer including
(a) an armature rotor including two parallel discs of magnetic material and a disc mounting means for fixedly mounting said discs to said shaft with a space between said discs,
(b) an inductor stator including a single pair of cores, each said core having a longitudinal axis parallel to the axis of said shaft and being made of a magnetic material whereby each said core has poles of opposite polarity, and
(c) a core mounting means for mounting said cores in the space between said discs so as to be radially removable and such that said cores are closely spaced to each said disc and are adjacent each other with adjacent poles of said cores having an opposite polarity, each axis of said cores forming a plane with the axis of said shaft such that an angle between the planes is between about 45° to 90°.

* * * * *